United States Patent [19]

Eggert, Jr.

[11] 4,386,600
[45] Jun. 7, 1983

[54] SUPPORT STRUCTURE FOR SUPPORTING A PLURALITY OF ALIGNED SOLAR REFLECTOR PANELS

[75] Inventor: Walter S. Eggert, Jr., Huntington Valley, Pa.

[73] Assignee: The Budd Company, Troy, Mich.

[21] Appl. No.: 236,862

[22] Filed: Feb. 23, 1981

[51] Int. Cl.³ .............................................. F24J 3/02
[52] U.S. Cl. .................................... 126/438; 126/424; 126/451; 350/289; 350/310
[58] Field of Search ............... 126/438, 439, 451, 424, 126/425; 350/288, 289, 293, 310

[56] References Cited

U.S. PATENT DOCUMENTS

| | | | |
|---|---|---|---|
| 528,255 | 10/1894 | Monks et al. | 126/438 X |
| 1,240,890 | 9/1917 | Shurman et al. | 126/438 X |
| 2,803,591 | 8/1957 | Coanda et al. | 126/438 |
| 4,161,942 | 7/1979 | Monk | 126/438 X |
| 4,281,900 | 8/1981 | Lewis, Jr. | 126/438 X |
| 4,306,540 | 12/1981 | Hutchinson | 126/438 X |

*Primary Examiner*—Larry Jones
*Attorney, Agent, or Firm*—Edward M. Farrell; Herman Foster; Thomas I. Davenport

[57] ABSTRACT

A support structure for supporting a plurality of solar reflectors include a truss structure having a plurality of bar elements welded together to provide strength and rigidity. Longitudinal connector elements are connected to the truss element to permit attachment to the aligned closely disposed reflector panels. A receiver element with means for compensating for dimensional changes is also attached to the support structure. A pedestal disposed at each end of the support structure is adapted to receive and hold the truss structure with the attached panels and receiver. The entire support structure is adapted to be rotatable in the pedestal structure about 360°.

8 Claims, 4 Drawing Figures

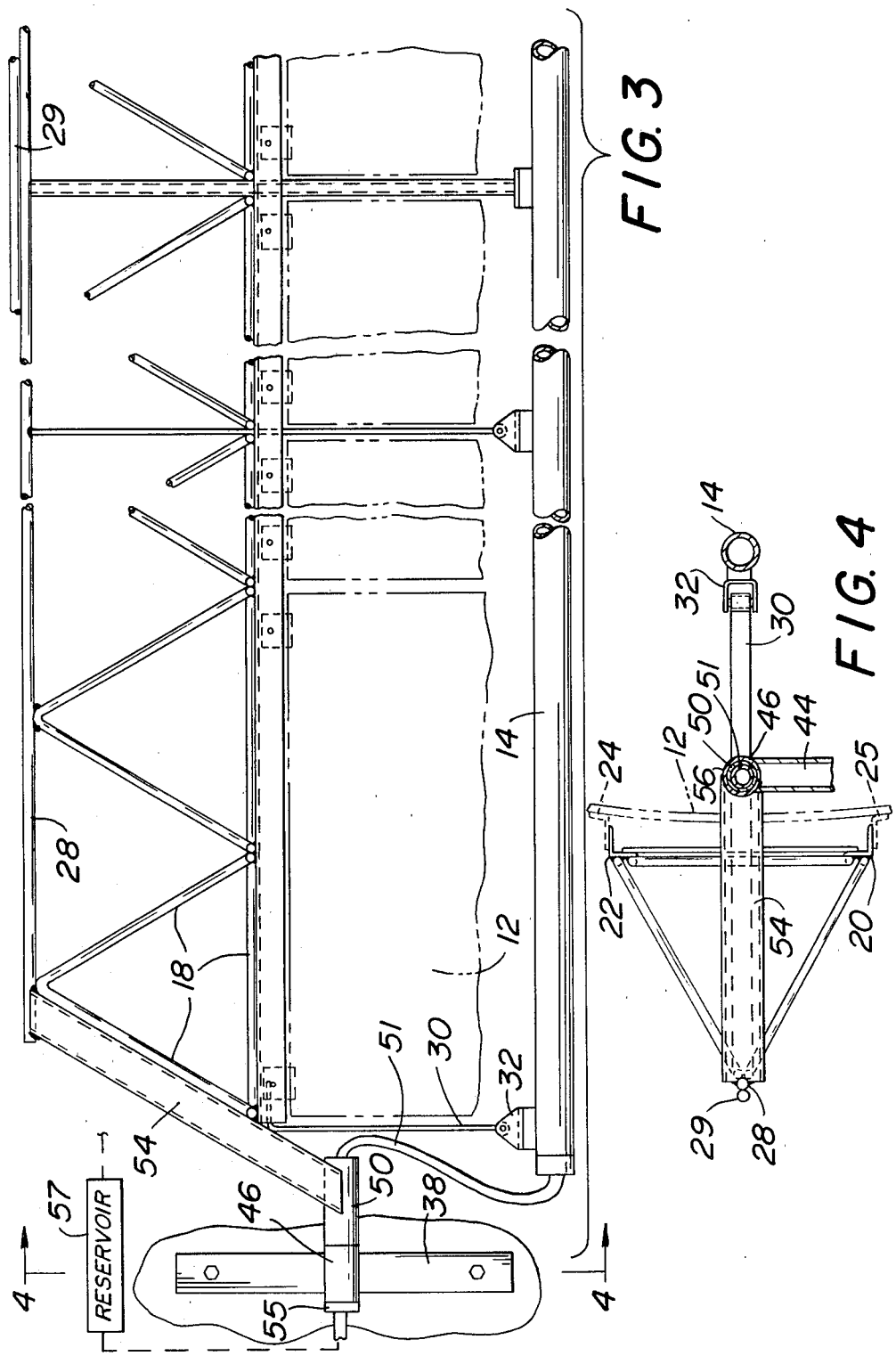

4,386,600

SUPPORT STRUCTURE FOR SUPPORTING A PLURALITY OF ALIGNED SOLAR REFLECTOR PANELS

BACKGROUND OF THE INVENTION

It is well known that solar energy may be utilized to provide energy in heating in many situations. In general, systems have been used with a large number of reflectors to receive energy from the sun to focus and reflect the rays to a receiver element. The receiver element may comprise a tubular member through which circulating water or oil is passed and heated by the reflected energy from the reflector.

One of the problems involved in providing an array of solar reflector panels relates to the alignment between adjacent panels. Because the panels often have independent drive means, they often must be individually aligned if an efficient overall system is to be provided.

In cases where a plurality of reflector panels were put on the same support structure and driven by a single drive means to facilitate alignment of the panels, the means for supporting the panels have heretofore been a limitation as to the number of panels to be held. The reason for this is that the support structure or strong back element has generally been too weak structurally to support more than a limited number of reflector panels.

In order to provide an efficient system wherein alignment and other problems are minimized, it is desirable to have as many reflector panels as possible on the same structure. This necessitates a strong support structure.

Another problem relating to some prior art systems is that the reflector panels are limited in their angle of rotation, for example, to 270°. This means that the reflector panels must be reversed in direction in order to properly align themselves to the sun rays the following day after use the preceding day. It is desirable in these cases to minimize this need to reverse the direction of the solar panel by enabling the panels to be rotated throughout 360°. Very often the reason for the limited rotation of the solar panels has been the various support structures which obstruct the maximum rotations of the panels. Also, the connections from the water or oil in the receiver to the reservoir limit the degree of rotation possible.

OBJECTS OF THE INVENTION

It is an object of this invention to provide an improved support structure for supporting a plurality of solar reflector panels.

It is a further object of this invention to provide an improved relatively long support structure for supporting a plurality of solar reflector panels in which a minimum number of ground support members are required.

It is still a further object of this invention to provide an improved support structure for supporting a plurality of solar reflector panels which is relatively stiff and in which the reflector panels are capable of being rotated 360°.

It is still a further object of this invention to provide an improved support structure for a plurality of solar reflector panels in which a receiver element associated with the panels is also supported and includes means for compensating the slight variations in dimensions in the receiver due to temperature changes.

SUMMARY OF THE INVENTION

In accordance with the present invention, a support structure for supporting a plurality of aligned longitudinally closely disposed solar reflector panels is provided. The support structure includes a truss structure made up of a plurality of welded bar elements having a pair of elongated connector members connected thereto disposed along the entire length of all the solar reflector panels. Connector elements are connected to each of the solar reflector panels to permit attachment to the elongated connector members on the truss structure. A pair of base means including pedestal members are disposed on opposite sides of the support structure. The support base means or pedestals each include a pivot element to permit rotation thereabout. Rotatable means are provided to connect the truss structure with the solar reflector panels attached thereto through the pivot elements to permit the support structure to be rotated about 360°. A receiver element is also supported by the support structure and means are provided to permit the receiver element to expand or contract in accordance with temperature changes without substantially changing the alignment of the collector element with respect to the reflector panels. The receiver element is connected to a liquid reservoir through elements which are rotated about 360° along with the entire assembly.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 3 is a partial top view of the system illustrated in FIG. 2; and

FIG. 4 is a cross-sectional view taken along lines 4—4 of FIG. 3.

DETAILED DESCRIPTION OF THE PREFERRED EMBODIMENTS

Figure 1:
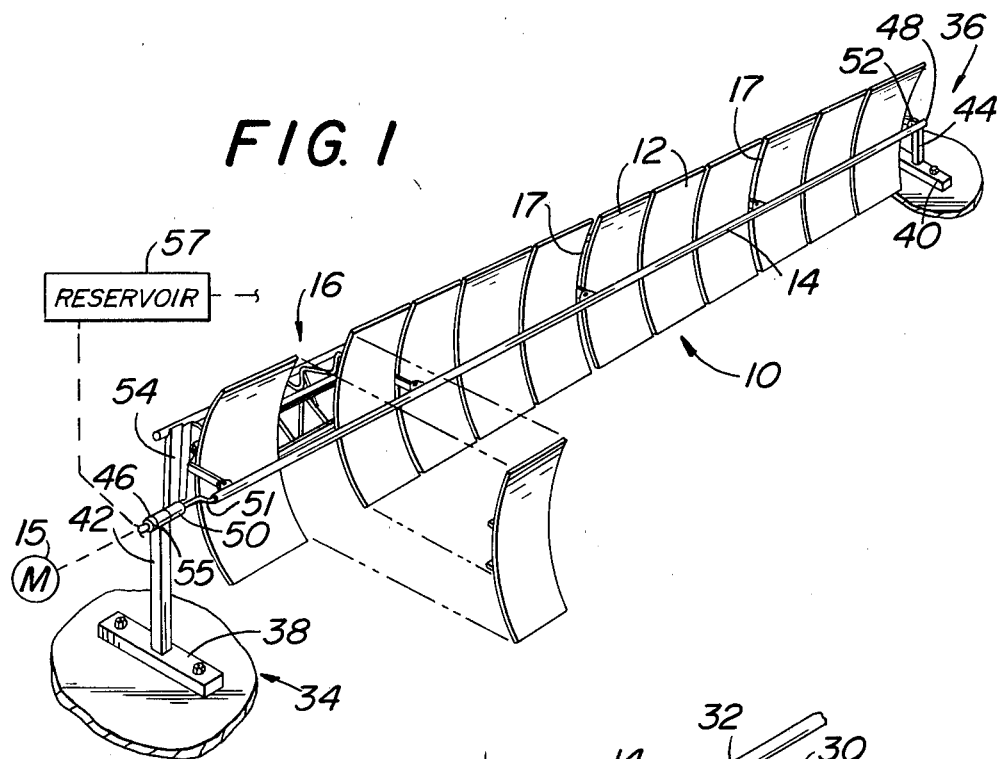
FIG. 1 is an isometric view of a solar energy system including a support structure, in accordance with the present invention.

Referring to FIG. 1, a solar energy collection system 10 comprises an array of solar reflector panels 12 curved so as to focus and reflect energy from sun rays to a receiver 14 in a conventional manner. The receiver 14 is precisely aligned so as to receive the energy transmitted from the curved surfaces of the panels 12. During operation, the panels 12 are moved so as to receive the maximum rays from the sun. The entire assembly including the panels 12 and collector 14 is adapted to be rotated to follow the maximum rays of the sun by conventional means illustrated as being a motor 15. The means for detecting the maximum rays and the means for moving the elements of the system in accordance with the sun rays are well known and will not be shown or described in detail because they are only incidentally related to the present invention.

The array of panels 12 is supported and held together by a truss structure 16 which extend from the rear of the panels 12. The truss structure 16 comprises a plurality of rods 18 which are welded together in a generally triangular fashion. The numerous bars 18 arranged in the truss structure are welded together to provide high rigidity and maximum strength. Such truss structures are well known to those skilled in the construction industries. A pair of angle bars 20 and 22 extend along the entire length of the array of panels 12.

Figure 2:
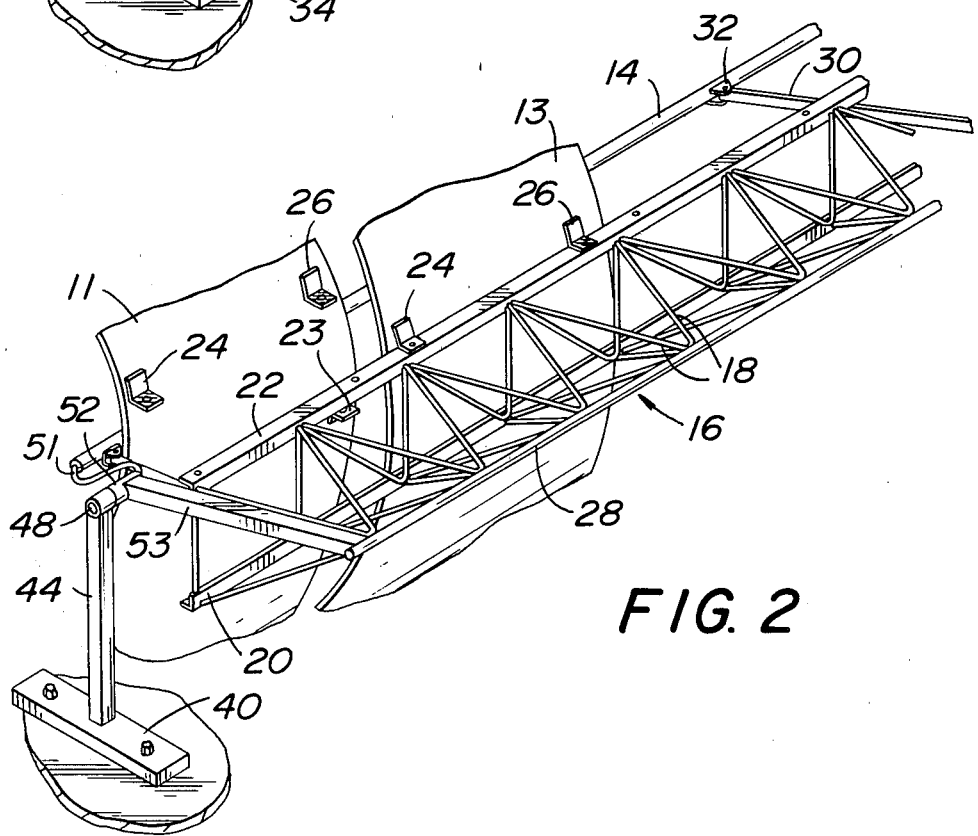
FIG. 2 is a partial rear view of the system illustrated in FIG. 1.

The assembly of rods 18 making up the truss structure 16 is welded to the angular bars 20 and 22 in the manner illustrated by conventional welding techniques. Each of the panels 12 include pairs of connector angle elements 24 and 26 and angle elements 23 and 25 (FIGS. 2 and 4). The panel 11 illustrates the connector elements 24 and 26 prior to attachment to the bar 22. The panel 13 illustrates the connectors 24 and 26 connected to the bar 22. The angle connector elements 23 and 25 are connected to the bar 20 in like manner.

A shaft 28 is connected toward the rear of the truss structure 16 at the joining ends of the rearwardly extending rods 18. The shaft 28, which is relatively strong, provides the means for supporting the truss structure 16, panels 12 and receiver element 14. The receiver element 14 is connected to the shaft 28 through small spaces 17 between the adjacent panels by means of a plurality of flexible support straps 30, as illustrated. The straps 30 extend from the collector 14 to the shaft 28. The straps 30 are flexible to provide compensation. One set of ends of the flexible straps 30 are fixed to the shaft 28 at one end with the other ends being connected to and being pivoted in brackets 32.

A plurality of such spaced brackets 32 are secured to the receiver 14. If the receiver 14 expands or contracts as a result of the temperature changes in the fluid flowing therethrough, the straps 30 will flex slightly to compensate for the expansion or contraction of the receiver. The flexing of the straps 30 maintains the receiver 14 in substantial alignment with the curved surfaces of the panels 12 even when they change in dimension slightly.

Water or oil is circulated from the receiver 14, through a hose 51, through central openings in members 46 and 50, to a fitting 55. The fitting 55 is connected to a reservoir 57. The water or oil is circulated from the reservoir through one end and out the other end of receiver 14.

The entire assembly illustrated is supported at both ends by pedestals 34 and 36. The pedestals each include base plates 38 and 40 which may be fixed in concrete in the ground or connected by some other means. A pair of posts 42 and 44 are provided on the plates 38 and 40, respectively. The top ends of the posts 42 and 44 each include cylindrical hollow members 46 and 48 adapted to receive hollow rotatable members 50 and 52.

The cylindrical members or bearings 46 and 48 receive the pivot rods or rotatable members 50 and 52. The rotatable members 50 and 52 are connected to one end of tubular members 53 and 54, respectively. The tubular members 53 and 54 are secured at their other ends to the shaft 28. The shaft 28 provides the main support for the assembly illustrated, and in some cases would include additional reinforcement members, such as an additional shaft or rod 29, for added strength. The hollow members 46 and 50, along with fitting 53, permit fluid to pass from the receiver through the hose 55 and reservoir 57.

FIG. 4 illustrates the various elements associated with the end structure of the assembly. In this figure, it is illustrated how the rotatable member 50 is disposed to rotate on the cylindrical member 46, which is secured to the end of the post 42. The bar 54 connects the member 50 to the shaft 28, which is reinforced by member 29.

Connector elements 24 and 25 are connected to angle bars 22 and 20, respectively. The end flexible strap 30 is connected between the bracket 32 and the shaft 28.

It is noted that the entire assembly illustrated including all the panels 12, receiver 14 and all its connections, are free to rotate about 360°. The reasons for this are that the driving means are conveniently disposed at the end of the assembly and there are no obstructions between the two ends of the assembly. Also, the hollow connections on the bearing and pin members permit connections to permit continuous rotation of the receiver 14.

The truss 16 provides an extremely stiff strong back capable of supporting a relatively large number of reflector panel structures with minimum deflection to provide high optical accuracy for the entire system. The truss is made up of relatively lightweight and conventional rod members which are readily welded together by conventional techniques. This makes mass production techniques available to reduce the costs involved. Reduction in costs is important if solar energy systems are to make any in roads towards reducing the use of other ways of producing energy, such as by using petroleum products.

What is claimed is:

1. A support structure for supporting a plurality of aligned longitudinally disposed solar reflector panels curved to reflect energy from sun rays to a receiver member comprising:
    (a) a truss structure including a plurality of angularly disposed tube elements welded together for holding said reflector panels and said receiver member;
    (b) a pair of elongated connector members connected to said truss structure extending along the entire length of said plurality of solar reflector panels;
    (c) connector elements connected to each of said solar collector panels attached to said pair of elongated connector members on said truss structure;
    (d) a pair of support base means at opposite ends of said truss structure;
    (e) receiver member comprising a tubular member and conduit connectors connected to both ends of said receiver member to permit fluid from a reservoir to be circulated therethrough; and
    (f) rotatable means for connecting the ends of said truss structure to said pair of support base means to permit said support structure with said receiver member to be rotated about 360° between said pair of support base means.

2. A support structure as set forth in claim 1 wherein a support shaft is connected to said truss structure spaced from said plurality of reflectors and extending along the length of said truss structure.

3. A support structure as set forth in claim 2 wherein end structural members are connected between the ends of said support shaft to said rotatable means.

4. A support structure as set forth in claim 3 wherein said rotatable means comprises tubular bearing members secured to said support base means for receiving tubular pivot members secured to the ends of said tubular members, said conduit connectors being connected between the ends of said receiver member and said tubular pivot members.

5. A support structure for supporting a plurality of aligned longitudinally disposed solar reflector panels and a receiver member comprising:

(a) a truss structure including a plurality of angularly disposed tube elements welded together for holding said reflector panels and said receiver member;
(b) a support shaft connected to said truss structure spaced from said plurality of reflectors and extending along the length of said truss structure;
(c) a pair of elongated connector members connected to said truss structure extending along the entire length of said plurality of solar reflector panels;
(d) connector elements connected to each of said solar collector panels attached to said pair of elongated connector members on said truss structure;
(e) a pair of support base means at opposite ends of said truss structure;
(f) rotatable means for connecting the ends of said truss structure to said pair of support base means to permit said support structure to be rotated about 360°;
(g) said rotatable means comprising tubular bearing members secured to said support base means for receiving tubular pivot members secured to the ends of said tubular members;
(h) end structural members connected between the ends of said support shaft to said rotatable means;
(i) said receiver member comprising a tubular member and conduit connectors connected to both ends of said receiver member to permit fluid from a reservoir to be circulated therethrough;
(j) said conduit connectors being connected between the ends of said receiver member and said tubular pivot members; and
(k) a plurality of strap members to connect and support said receiver member to said support shaft.

6. A support structure as set forth in claim 5 wherein said plurality of strap members are flexible members with two ends and each having one end fixed to said support shaft with the other end pivotally connected to said receiver member.

7. A support structure as set forth in claim 6 wherein a plurality of spaced brackets are connected to said receiver member to receive the other ends of said plurality of flexible strap members, the pivoted connections of the other ends of the flexible strap members permitting changes in dimensions of said receiver member without substantially changing the alignment of said receiver member with respect to said plurality of solar reflector panels.

8. A support structure as set forth in claim 7 wherein relatively small spaces are provided between some of said reflector panels and said flexible strap members extend from said receiver member to said support shaft through said spaces.

* * * * *